United States Patent [19]

Clifford

[11] 4,039,005

[45] Aug. 2, 1977

[54] FLOW DIVERSION MEANS

[76] Inventor: Gary John Clifford, 11 Beck Street, Clontarf, Queensland 4109, Australia

[21] Appl. No.: 641,691

[22] Filed: Dec. 17, 1975

[30] Foreign Application Priority Data

Dec. 19, 1974 Australia .............................. 0078/74

[51] Int. Cl.² ............................................ F16K 31/12
[52] U.S. Cl. .................................. 137/609; 134/104; 137/362; 137/612
[58] Field of Search ............ 137/119, 362, 612, 612.1, 137/12, 609; 134/104

[56] References Cited

U.S. PATENT DOCUMENTS 1,795,123   3/1931   Harris ..................................... 137/236
3,636,980   1/1972   Maloney .......................... 137/612 X Primary Examiner—Alan Cohan
Assistant Examiner—Gerald A. Michalsky
Attorney, Agent, or Firm—Sughrue, Rothwell, Mion, Zinn and Macpeak

[57] ABSTRACT

Flow diversion means are provided particularly for selectively discharging fluids emanating from different sources. The flow diversion means may be installed, in one application, in an uncovered wash down area, used for example for cleaning vehicles or the like. Flow diversion means are provided for a sump or the like, adapted to collect run-off liquid from a surface, said flow diversion means including first and second outlet means and an outlet valve assembly co-operating operatively therewith and operable to place either said first or said second outlet means in liquid communication with said sump, and control means for selectively operating said outlet valve assembly.

13 Claims, 4 Drawing Figures

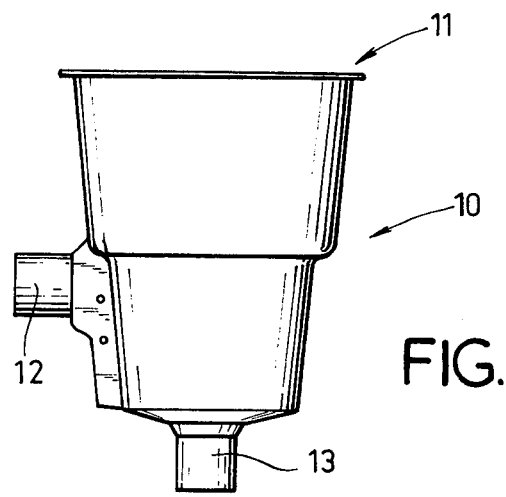
FIG. 2.
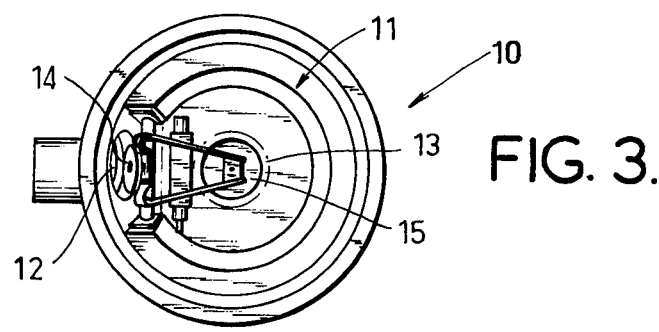
FIG. 3.
FIG. 4.
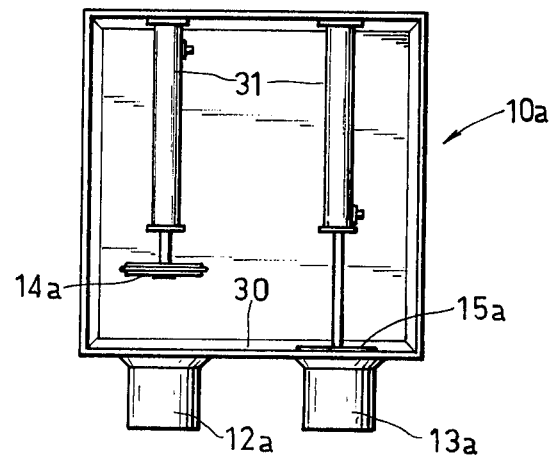

FLOW DIVERSION MEANS

This invention relates to flow diversion means and in particular, it relates to flow diversion means for selectively discharging fluids amanating from different sources.

In a particular installation, the invention is adapted to be installed in an uncovered wash down area, used for example, for cleaning vehicles or the like. Such an open area is normally provided with storm water drainage to drain away excess surface water, often into a stream. When the area is used as a wash down area, the surface water or other fluid used for washing purposes is polluted and cannot be discharged into a stream without polluting the stream. The invention is adapted to be installed to divert the polluted wash water away from the storm water outlet and say, into a waste disposal system.

In an instance when the process water or fluid cannot be discharged directly into the storm water, the problem can be and is often overcome by erecting a roof over the area to be used and the process water or fluid is discharged directly into a waste disposal system, the roof being necessary to prevent storm water entering the system and overloading same. Of course, this method of solving the problem, while effective, is very expensive, especially if a large area has to be covered. Also there are other instances where it would be desirable to selectively direct spillage towards different collection stations. For instance, in a refueling bay. Normally, in such an area, the surface water or other fluid or spillage is discharged to a treatment system for removal of the pollutants prior to discharge to the sewage. However, spilled fuel could be selectively collected for recycling purposes instead of discharging same with the other pollutants.

Accordingly, it is an object of the present invention to provide a method of and apparatus for selectively directing fluids emanating from different sources to a desired station and which will prove reliable and efficient in operation. It is also an object of this invention to provide such apparatus that will operate automatically to selectively divert and thus separate different process fluids dependant on the process being carried out. Other objects and advantages of the invention will become apparent from the following description which is given by way only as an illustrative example of a preferred embodiment of the invention installed for use in an open wash down area.

With the foregoing and other objects in view, this invention resides broadly in flow diversion means for a sump or the like, adapted to collect run-off liquid from a surface, said flow diversion means including first and second outlet means and an outlet valve assembly co-operating operatively therewith and operable to place either said first or said second outlet means in liquid communication with said sump, and control means for selectively operating said outlet valve assembly.

In order that the invention may be more readily understood and put into practical effect, reference will now be made to the accompanying drawings, wherein:

FIG. 2 is a side elevational view of a sump made in accordance with the present invention;

FIG. 3 is a plan view of the sump illustrated in FIG. 2; and

FIG. 4 is a plan view of an alternate form of sump made in accordance with the present invention.

Figure 1:
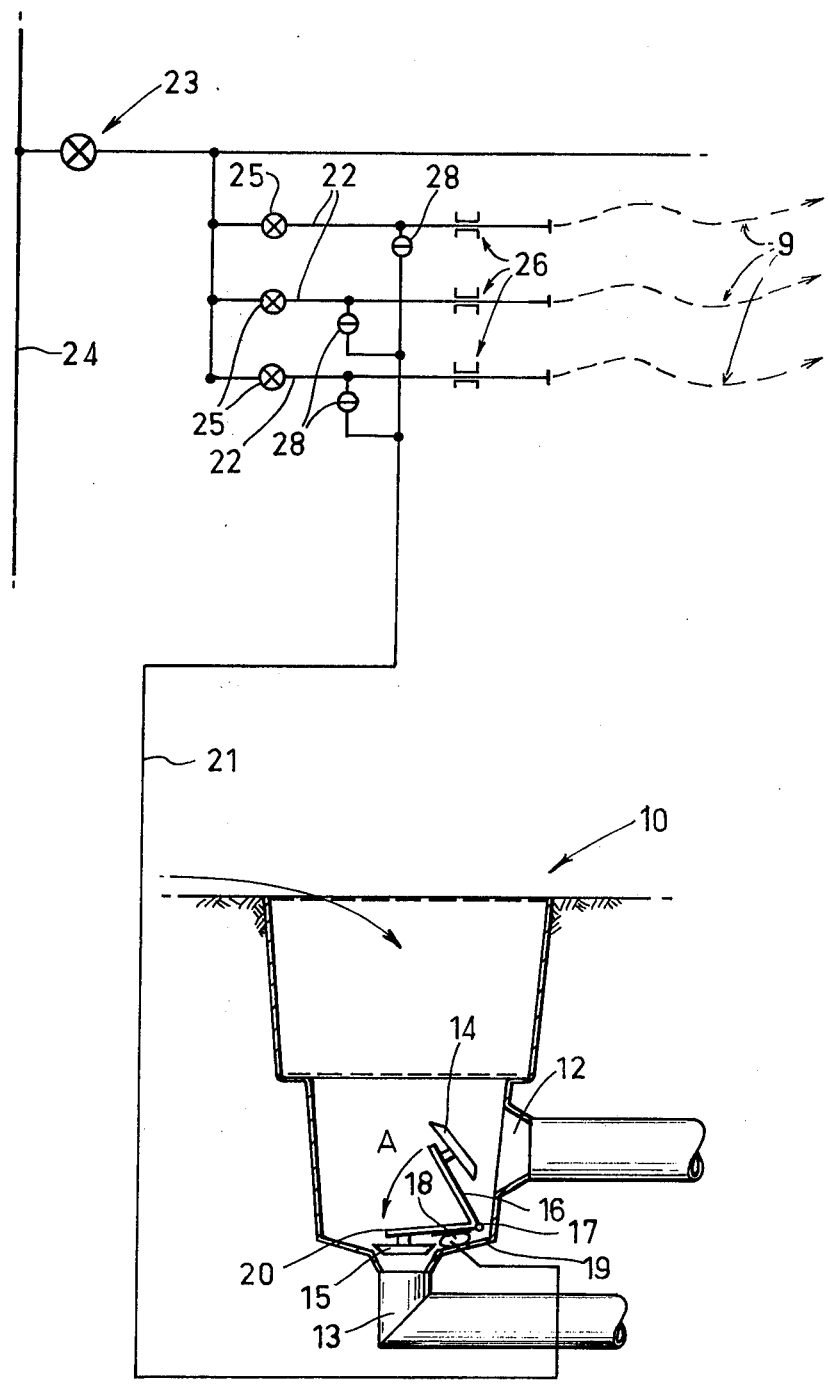
FIG. 1 is a schematic illustration of a typical installation of the invention.

The drawings illustrate a sump assembly 10 made in accordance with the invention and adapted for installation in an uncovered area for collection and drainage of storm water and collection and drainage of a process fluid which say, may issue from any one of a plurality of hoses 9. Such an uncovered area may be used for example as a wash down area for vehicles. Normally, the sump 10 is used to drain storm water from the area, and for this purpose it is provided with an open top 11 through which run-off may enter and flow into the sump 10, and a storm water outlet 12 through which the storm water can flow for discharge into a stream or the like.

When the area is used for washing down vehicles the wash down fluid is contaminated with pollutants removed from the dirty vehicles and accordingly, it is undesirable to discharge the pollutants into a stream and pollute same. Accordingly, the sump assembly 10 is provided with a lower outlet 13 adapted for discharge of the contaminated process fluid to a waste treatment system prior to discharge to the sewage.

As shown schematically in FIG. 1 and FIG. 3, the outlets 12 and 13 are provided with co-operating valve members 14 and 15 respectively which are supported on a common pivot frame 16 pivoted about a horizontal axis 17 intermediate the valve members 14 and 15 so that either valve member may be moved alternatively into engagement with the respective outlet to close same. Normally, the weight of the valve members and the frame 16 is sufficient to cause the valve assembly to pivot in the direction of arrow A to maintain the lower valve member 15 in operative engagement with the outlet 13 to close same and to maintain the upper valve member 14 spaced from the upper storm water outlet 12. Under normal conditions run-off water entering the sump 10 fills the lower portion of the sump 10 and drains through the storm water outlet 12.

A bellows 18 is provided disposed between the base 19 of the sump 10 and the lower arm 20 of the pivot frame 16 and arranged so that upon inflation thereof expansion causes upward movement of the lower arm 20, disengagement of the valve member 15 with the lower outlet 13 and engagement of the upper valve member 14 with the storm water outlet 12. Thus when the bellows 18 is in its inflated condition the lower outlet 13 is opened and the storm water outlet 12 is closed. For automatic actuation of the bellows 18 there is provided a control hose 21 communicating with the respective supply pipes 22 adapted for supply to the process fluid, for example wash down water, to the hoses 9.

As shown the supply pipes 22 are connected through a main control valve 23 to the water main 24. Each supply pipe 22 is provided with its respective control cock 25 for controlling flow of water to and from the hoses 9. Each supply pipe 22 is provided with restricting means 26 at the side of the connection of the control hose 21 remote from the cock 25. The restriction can be in the form of an orifice plate in order to ensure that upon flow of water through the pipes 22, a minimum velocity head in the portion of the pipe upstream of the restricting means and in the control hose 21 to cause inflation of the bellows 18 and thus actuation of the valve assembly.

Thus, whenever a hose 9 is utilised to wash down a vehicle so that run-off liquid is produced containing contaminants or pollutants, the bellows 18 is automatically operated to open the lower outlet 13 so that such run-off will be discharged therethrough and not through the storm water outlet 12 which has been correspondingly closed. Between the connection of the control hose 21 and the respective supply pipes 22 there is provided a non-return valve 28 to ensure that the operational velocity head is maintained irrespective of the hoses in use and the condition of the other hoses.

FIG. 4 illustrates an alternate embodiment of the sump 10a in which the upper storm water outlet 12a and the lower sewage outlet 13a are both provided in one side 30 of the rectangular shaped sump 10a. The respective valve members 14a and 15a are supported at the end of the movable ram of a pair of fluid actuated telescopic ram assemblies 31 adapted to be connected to the supply hose 21. As shown the connection to the telescopic ram controlling the valve member 14a is at the rear of the piston of the ram while the connection to the hydraulic ram controlling the valve member 15a is at the front of the piston of the ram. The rams are provided with internal return springs so as to maintain them in their normal operative disposition, that is, the valve member 14a remote from the storm water outlet 12a and the valve member 15a across the lower outlet 13a. As the pressure in the supply line 21 increases the position of the valve members 14a and 15a are moved to their reverse positions for flow of process fluid through the lower outlet 13a. The connections to the respective rams are provided with adjustment means whereby the rate of retraction and extension of the rams may be selectively varied to provide the degree of overlap between the time of opening and closing of the respective outlets depending on the operating conditions. Such regulation may be also provided in the previous embodiment by providing a selectively adjustable needle valve in the line 21. The needle valve being adjustable to regulate closing speed to ensure that all polluted liquid is drained through the lower outlet prior to the storm water outlet being opened.

Of course the apparatus according to the invention may be installed in covered areas where it is desired to selectively divert a particular process fluid for separate collection for normal drainage from the area. The sumps are provided with upper and lower ledges for supporting a grate and a removable strainer in known manner and, if desired a pressure switch or mechanical switch may be associated with the valve assembly to operate audible or visual devices to signify the condition of the valve means, say—storm water open or closed.

It will of course be realised that many other modifications of constructional detail and design may be made to the above described embodiments by persons skilled in the art, however, all such variations and modifications as will be apparent to such persons are deemed to fall within the broad scope and ambit of the invention as is herein set forth in the appended claims.

What I claim is:

1. Flow diversion means for a sump or the like adapted to collect separately, as run-off liquid from a surface; various liquids including a process liquid from a supply pipe, said flow diversion means including first and second outlet means from said sump and an outlet valve assembly co-operating operatively therewith and operable to place either said first or said second outlet means in liquid communication with said sump, said outlet valve assembly being normally biased to maintain said first outlet means in said closed condition, there being further provided control means connected operatively to said supply pipe whereby upon supply of liquid from said supply pipe, said outlet valve assembly operates automatically to close said second outlet means and simultaneously open said first outlet means so that process liquid entering said sump from said supply pipe will be diverted through said first outlet means.

2. Flow diversion means according to claim 1, wherein said second outlet means is spaced above said first outlet means.

3. Flow diversion means according to claim 2, wherein said surface comprises an open floor for collecting storm water run-off from said floor as well as process liquids discharged onto said floor, and wherein said second outlet means is adapted for connection to storm water mains and said first outlet means is adapted for connection to a waste treatment system.

4. Flow diversion means according to claim 2, wherein said control means is operable by fluid pressure and wherein said operative connection to said supply pipe includes a control hose communicating with said supply pipe and said control means in such manner that pressure build-up in said supply pipe is transmitted to said outlet valve assembly to actuate same.

5. Flow diversion means according to claim 4, wherein said supply pipe includes a valve for controlling flow therethrough and is further provided with flow restricting means between its outlet and the valve controlling flow therethrough and wherein said control hose is connected operatively to said supply pipe at a position intermediate said valve controlling flow through said supply pipe and said flow restricting means.

6. Flow diversion means according to claim 4, wherein said control means comprises a fluid actuated telescopic ram assembly.

7. Flow diversion means according to claim 6, wherein said telescopic ram assembly comprises a pair of rams each connected to a respective valve member adapted to cooperate with the respective outlet means.

8. Flow diversion means according to claim 4, wherein said first and second outlet means are disposed substantially at right angles to one another and said outlet valve assembly comprises a pair of valve members adapted for operative cooperation with a respective outlet means and supported on a valve frame assembly adapted for pivoted connecting to said sump in such manner that either valve member may be moved pivotally, alternately into or out of engagement with the respective outlet means and wherein said control means includes a bellows connected operatively to said control hose and adapted upon expansion to pivot said frame.

9. Flow diversion means according to claim 8, wherein said first outlet means comprises a valve seat adapted to be arranged at the bottom of said sump about a vertical axis and said second outlet means comprises a valve seat adapted to be arranged at the side of said sump about a horizontally extending axis.

10. A system for diverting fluid, spilled from a supply pipe and collected at a common drainage station, to a process fluid outlet remote from a common outlet for fluids collected at said common drainage station, said system comprising valve means to control flow of fluids through said outlet; means biasing the valve means controlling flow through said common outlet to an open condition and the valve means controlling flow through said process fluid outlet to a normally closed position, and control means connected between said supply pipe and said valve means for causing, upon commencement of flow through said supply pipe, actuation of said valve means to open said process fluid outlet and close said common outlet.

11. A sump assembly having an inlet arranged to collect separately a plurality of liquids each emanating from a respective liquid source and to discharge the so-collected liquid through a respective one of a plurality of outlet means provided therein, said sump assembly having an outlet valve assembly adapted to cooperate operatively with said outlet means so as to place the respective outlet means in liquid communication with said sump for outflow of collected liquid therethrough, and control means adapted to monitor each liquid source to automatically actuate said outlet valve assembly to open the respective outlet means for outflow of the collected liquid emanating from the respective monitored source.

12. Flow diversion means for a sump or the like adapted to collect separately, as run-off liquid from a surface, polluted processed liquid or clean liquid each amanating from a different source, said flow diversion means including first and second outlet means from said sump and an outlet valve assembly cooperating operatively therewith and operable in a first mode of operation in which said first outlet means is open for outflow of said clean liquid with said second outlet means closed, and in a second mode of operation in which said second outlet means is open for outflow of said polluted processed liquid with said first outlet means closed, and there being further provided control means adapted to monitor the polluted processed liquid source to automatically actuate said outlet valve assembly to operate in the respective mode of operation for outflow of the collected liquid emanating from respective sources through the respective outlet means.

13. Flow diversion means according to claim 12, wherein said outlet valve assembly further comprises means for biasing said assembly for operation in said first mode of operation.

* * * * *

UNITED STATES PATENT AND TRADEMARK OFFICE
CERTIFICATE OF CORRECTION

PATENT NO. : 4,039,005
DATED : August 2, 1977
INVENTOR(S) : Gary John Clifford

It is certified that error appears in the above—identified patent and that said Letters Patent are hereby corrected as shown below:

In claim 10, line 6, change [outlet] to --- outlets ---

In claim 12, line 4, change [amanating] to --- emanating -----

Signed and Sealed this

Eleventh Day of April 1978

[SEAL]

Attest:

RUTH C. MASON
*Attesting Officer*

LUTRELLE F. PARKER
*Acting Commissioner of Patents and Trademarks*